United States Patent [19]

Baer et al.

[11] Patent Number: 5,011,701

[45] Date of Patent: Apr. 30, 1991

[54] LOW CALORIE FOOD PRODUCTS HAVING SMOOTH, CREAMY, ORGANOLEPTIC CHARACTERISTICS

[75] Inventors: Cynthia C. Baer, Arlington Heights; Gregory S. Buliga, Mt. Prospect; Gerard L. Hassenheutti, Highland Park; George A. Henry, Wilmette; Alice A. Heth, Evanston; Linda K. Jackson, Lincolnshire; Jill M. Kennedy-Tolstedt, DesPlaine; Phillip J. Kerwin, Wilmette; Mark S. Miller, Arlington Heights; Elizabeth M. Parker, DesPlaines; Neela K. Paul, Clarendon Hills; David G. Pechak, Glen Ellyn; Gary F. Smith, Highland Park; Vernon C. Witte, Naperville, all of Ill.

[73] Assignee: Kraft General Foods, Inc., Glenview, Ill.

[21] Appl. No.: 395,800

[22] Filed: Aug. 18, 1989

Related U.S. Application Data

[63] Continuation-in-part of PCT US89/01813 filed Apr. 28, 1989 which is a continuation-in-part of Ser. No. 292,568, Dec. 30, 1988, which is a continuation-in-part of Ser. No. 188,283, Apr. 29, 1988 abandoned, Ser. No. 24,507 filed as PCT US85/01265 on Jul. 1, 1985, Pat. No. 4,762,726, which is a continuation-in-part of Ser. No. 567,096, Dec. 30, 1983, Pat. No. 4,563,360 which is a continuation-in-part of Ser. No. 567,277, Dec. 30, 1983, Pat. No. 4,559,233, which is a continuation-in-part of Ser. No. 081,115, Aug. 3, 1987, abandoned, which is a continuation-in-part of Ser. No. 658,618, Oct. 9, 1984, Pat. No. 4,684,533.

[51] Int. Cl.$^5$ .................... A23L 1/0534; A23L 1/24; A23L 1/308

[52] U.S. Cl. .................... 426/573; 426/589; 426/602; 426/604; 426/613; 426/658; 426/804

[58] Field of Search ............... 426/573, 575, 574, 658, 426/589, 613

[56] References Cited

U.S. PATENT DOCUMENTS

| | | | |
|---|---|---|---|
| 3,023,104 | 2/1962 | Battista | 426/549 |
| 3,278,519 | 10/1966 | Battista | 426/658 |
| 3,573,058 | 3/1971 | Tiemstra | 426/658 |
| 4,269,974 | 5/1981 | Wintersdorff | 426/589 |
| 4,341,807 | 7/1982 | Turbak et al. | 426/573 |
| 4,378,381 | 3/1983 | Turbak et al. | 426/573 |
| 4,452,722 | 6/1984 | Turbak et al. | 426/573 |
| 4,559,233 | 12/1985 | Chen et al. | 426/574 |
| 4,563,360 | 1/1986 | Soucie | 426/574 |
| 4,684,533 | 8/1987 | Kmatochoil | 426/575 |
| 4,747,881 | 5/1988 | Shaw | 426/573 |
| 4,762,726 | 8/1988 | Soucie et al. | 426/602 |
| 4,774,095 | 9/1988 | Kleinschmidt | 426/573 |
| 4,857,352 | 8/1989 | Miller et al. | 426/573 |

*Primary Examiner*—Jeanette Hunter
*Attorney, Agent, or Firm*—Fitch, Even, Tabin & Flannery

[57] ABSTRACT

The present invention is directed to a method for preparing a low fat or substantially fat-free food product such as pourable dressings and viscous dressings. The method includes the steps of heating and repeatedly shearing at least two times an aqueous dispersion consisting of from about 3 to about 10 weight percent of microcrystalline cellulose and from about 90 to about 97 weight percent water. The shearing occurs in a high shear zone having a pressure drop of at least 12,000 psi and the shearing is sufficient to fragment the microcrystalline cellulose to submicron sized microcrystalline cellulose fragments. The microcrystalline cellulose fragments are reagglomerated under high shear conditions to produce an aqueous dispersion of porous microreticulated microcrystalline particles having a void volume of at least about 25 volume percent, a mean particle size in the range of from about 5 to about 20 microns, and a particle size distribution such that at least about 75 weight percent of the particles have a maximum dimension of less than about 25 microns. The microreticulated microcrystalline cellulose dispersion is combined with from about 2 to about 33 weight percent of xanthan gum, based on the dry weight of the microreticulated microcrystalline cellulose dispersion. The xanthan stabilized microreticulated microcrystalline cellulose dispersion is then blended with additional food components to provide a low fat or fat-free food product. The food product has from about 0.25 to about 4 weight percent of dispersed microreticulated microcrystalline cellulose, from about 50 to about 99 weight percent of water, from about 1 to about 35 weight percent of carbohydrates, from about 0 to about 10 weight percent protein, and less than about 7 weight percent triglycerides.

5 Claims, 10 Drawing Sheets

BROOKFIELD VISCOSITY
VS. NUMBER OF PASSES

MEDIAN PARTICLE DIAMETER
VS. PROCESSING TIME

— SAMPLE 1
···· SAMPLE 2
--- SAMPLE 3

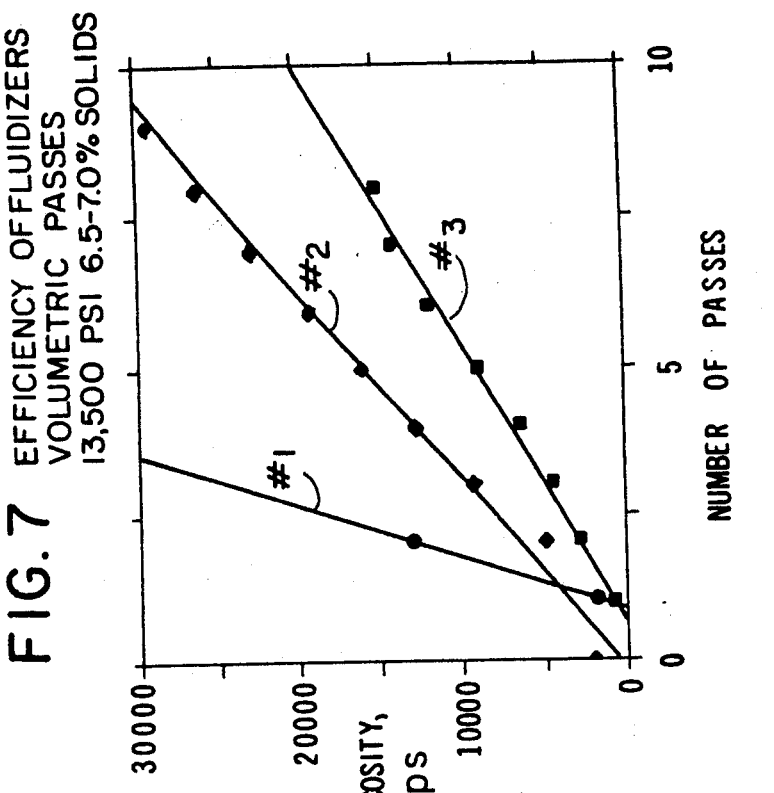
FIG. 7 EFFICIENCY OF FLUIDIZERS
VOLUMETRIC PASSES
13,500 PSI 6.5-7.0% SOLIDS
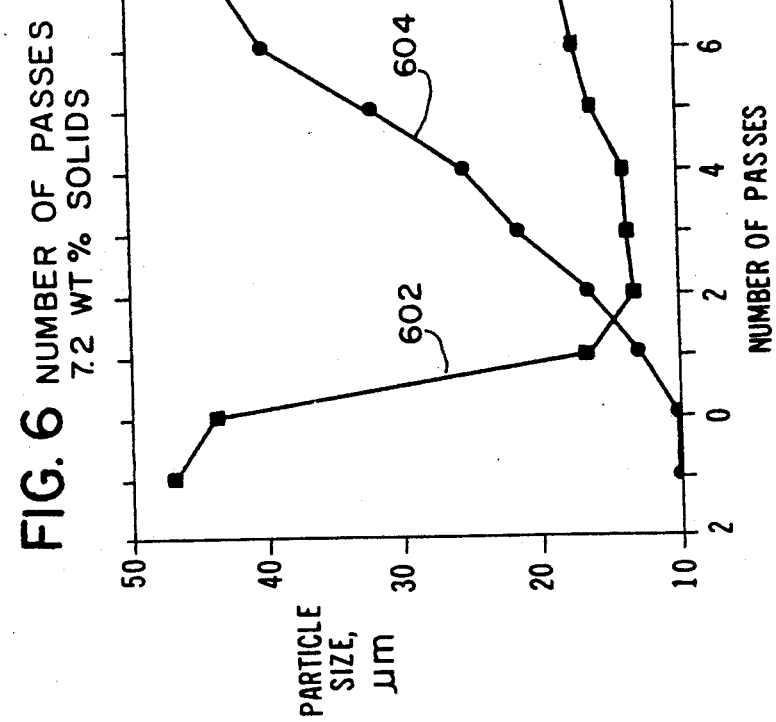
FIG. 6 NUMBER OF PASSES
7.2 WT% SOLIDS

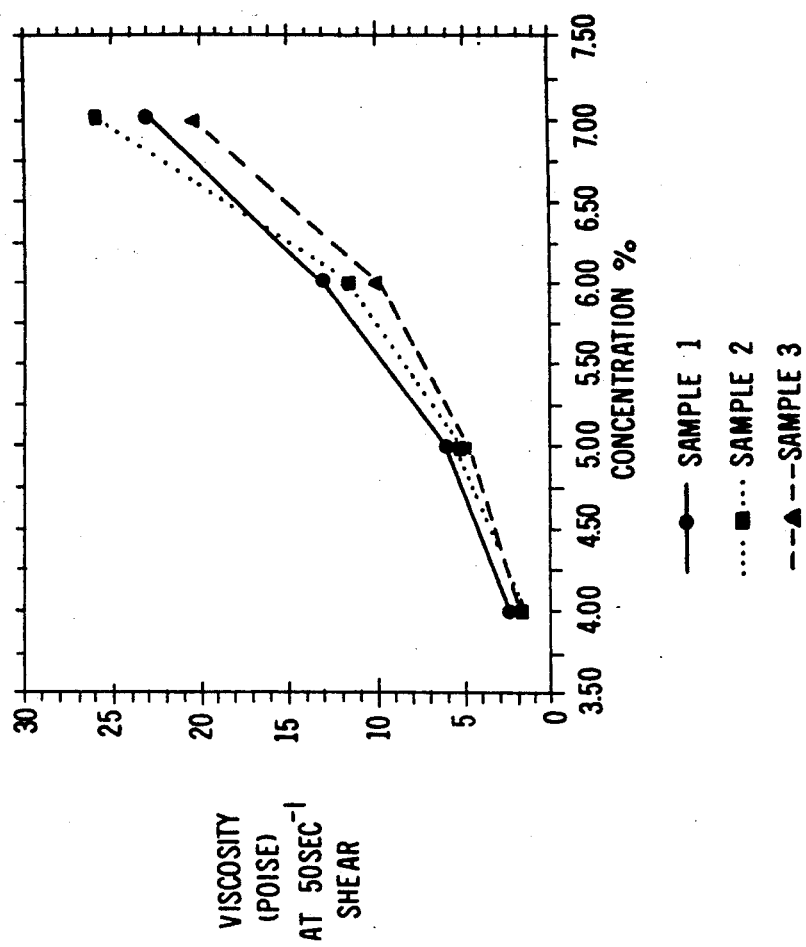
FIG. 9 CONCENTRATION DEPENDENCE 8 PASSES
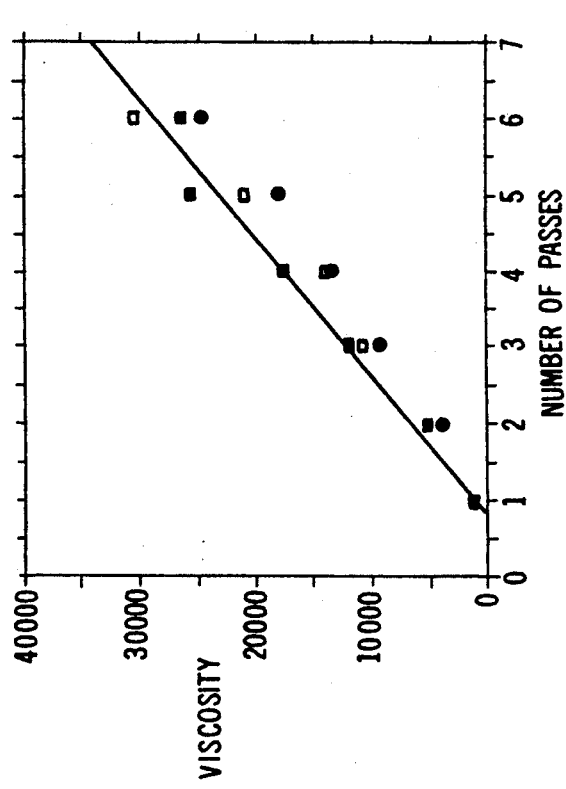
FIG. 8 SERIES PASS PROCESSING

FIG.12A
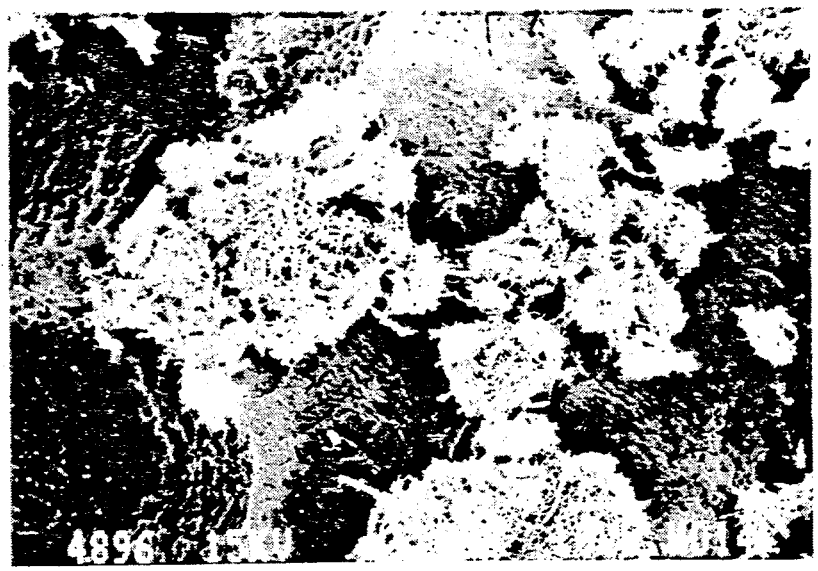
PH 101 AFTER    CRYO SEM
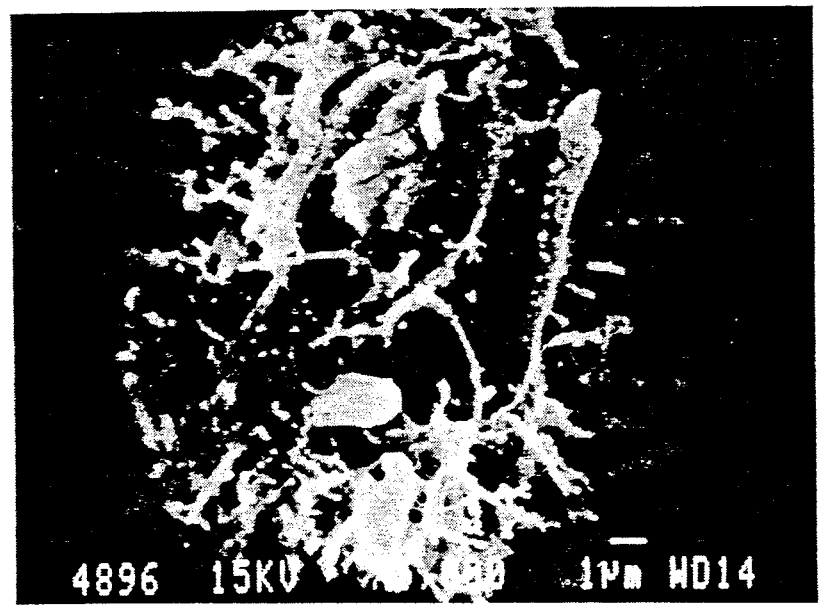
FIG.12B

LOW CALORIE FOOD PRODUCTS HAVING SMOOTH, CREAMY, ORGANOLEPTIC CHARACTERISTICS

CROSS-REFERENCE TO RELATED APPLICATIONS

This application is a continuation-in-part of PCT application No. PCT/US89/01813 filed Apr. 28, 1989, which is a continuation-in-part of U.S. application Ser. No. 292,568 filed Dec. 30, 1988, which is a continuation-in-part of U.S. patent application Ser. No. 188,283 filed Apr. 29, 1988, now abandoned and U.S. patent application Ser. No. 177,184 filed Apr. 4, 1988, now abandoned U.S. patent application Ser. No. 024,507 filed as PCT application US85/01265 on July 1, 1985, which entered national stage in the United States on Mar. 1, 1987, now U.S. Pat. No. 4,762,726, which is a continuation-in-part of U.S. patent application Ser. No. 567,096 filed Dec. 30, 1983, now U.S. Pat. No. 4,563,360, and U.S. patent application Ser. No. 567,277 filed Dec. 30, 1983, now U.S. Pat. No. 4,559,233, and is a continuation-in-part of U.S. application Ser. No. 081,115 filed Aug. 3, 1987, abandoned in favor of continuation-in-part application Ser. No. 307,069 filed Feb. 6, 1989, now abandoned which is a continuation-in-part of U.S. application Ser. No. 658,618 filed Oct. 9, 1984, now U.S. Pat. No. 4,684,533, which are incorporated by reference herein.

BACKGROUND OF THE INVENTION

The present invention is directed to low calorie, substantially fat-free food products having exceptional organoleptic mouthfeel characteristics simulating fat containing food products, such as substantially fat-free, fat-mimetic frozen desserts, viscous dressings, and pourable dressings.

Very significant technical effort has been directed over many years to the development of reduced fat or substantially fat-free food products which possess a smooth and creamy mouthfeel, texture and lubricity accurately simulating the texture and mouthfeel of edible fat containing food products.

Such efforts include the use of various types of undigestible fat-like materials such as sucrose polyesters and polyglycerol polyesters which pass through the digestive system without absorption. Substantial work has also been carried out over an extended period of time with bulking agents such as powdered and microcrystalline cellulose in fat-containing and reduced fat food products. In this regard, for example, U.S. Pat. Nos. 3,067,037, 3,141,875, 3,157,518, 3,251,824, 3,388,119, 3,539,365, 3,573,058, 3,684,523, 3,947,604, 4,199,368 and 4,231,802, 4,346,120, 4,400,406, 4,427,701 and 4,421,778 relate to the preparation, or use of various types of cellulose in various food products. Such cellulose materials have been used or proposed for reduced fat or substantially fat-free food products. However, as the fat content is reduced in food products containing substantial levels of cellulose products such as microcrystalline cellulose, adverse organoleptic effects such as a mouth-coating or astringency sensations, and a lack of a well-rounded organoleptic sensation corresponding to that provided by conventional fat-containing food products such as ice cream, and viscous and pourable dressings, tend to become more pronounced.

High pressure treatment and attrition of microcrystalline cellulose, and the use of gums to prevent reagglomeration of crystalline cellulose particles has been used to prepare "colloidal" grades of microcrystalline cellulose having a high proportion of the cellulose in particles of submicron-size. High pressure homogenization of fibrous cellulose pulp, as opposed to microcrystalline cellulose, has also been used to produce a "microfibrillated" fibrous product for food product utilization [e.g., see U.S. Pat. Nos. 4,089,981, 4,143,163, 4,341,807, 4,374,702, 4,481,076, 4,481,077 and 4,659,388].

Microcrystalline cellulose has been used in low and reduced calorie food formulations as both a carbohydrate thickening agent and as a fat replacer, with powdered products of relatively large particle size (e.g., 15-90 micrometer length) utilized for carbohydrate reduction and colloidal grades of submicron size being used to reduce fat. However, as the fat content is reduced in food products containing substantial levels of microcrystalline cellulose, adverse organoleptic effects such as a mouth-coating or astringency sensations, and a lack of a well-rounded organoleptic sensation corresponding to that provided by conventional fat-containing food products, tend to become more pronounced, and accordingly, fully acceptable fat-free food products have not generally been provided. In addition, microcrystalline cellulose may produce an astringent or drying mouthfeel when used as a substantially full-fat replacement, which is deleterious to the acceptability of the product.

It is an object of the present invention to provide methods for the manufacture of novel, nutritious, low calorie, substantially fat-free food compositions such as frozen desserts and food dressings which have exceptional, smooth, creamy oil-like textures and well rounded fat mimetic mouthfeel characteristics, as well as desirable stability and functionality characteristics. It is a further object to provide novel, substantially fat-free food compositions such as frozen desserts, viscous food dressings and pourable dressings which have such characteristics. These and other objects of the invention will become apparent from the following detailed description and the accompanying drawings.

DESCRIPTION OF THE DRAWINGS

FIG. 6 is a graph of the viscosity of and particle size of microcrystalline cellulose as a function of the number of passes of a 7.2 percent solids aqueous dispersion through microreticulator apparatus of the type shown in FIG. 1;

FIG. 7 is a graph of the Brookfield viscosity of a microcrystalline cellulose dispersion as a function of the number of passes through three different microreticulation systems of the type shown in FIG. 1, which are of varying size;

FIG. 8 is a graph of the viscosity of a microcrystalline cellulose dispersion as a function of the number of discrete passes through apparatus of the type shown in FIG. 2;

FIG. 9 is a graphical representation of the viscosity of three different microcrystalline cellulose runs using apparatus of the type shown in FIG. 1;

FIGS. 12A and 12B are cryo-scanning electron micrographs in low magnification (FIG. 12A) showing the relative size and distribution of microreticulated microcrystalline cellulose particles and in higher magnification (FIG. 12B) illustrating the composition of a single microreticulated aggregate, showing its open nature;

DESCRIPTION OF THE INVENTION

Figure 3:
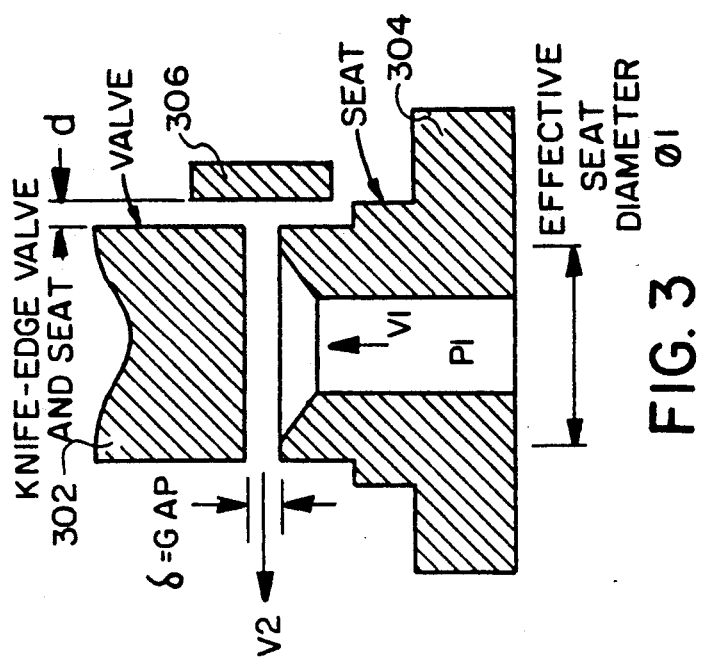
FIG. 3 is a cross-sectional view of a circular superpressure processing valve of microreticulation apparatus such as illustrated in FIGS. 1 and 2.

The present invention is directed to substantially fat-free, fat-mimetic low calorie food products, such as frozen desserts, viscous food dressings such as mayonnaise-like dressings and pourable food dressings, such as pourable salad dressings, having organoleptic fat-like characteristics closely simulating such food products which conventionally have relatively high fat content. Such fat-free, fat-mimetic food products utilize an aqueous microreticulated microcrystalline cellulose dispersion having specific viscosity, particle size, and microreticulation characteristics, as well as stability and mouthfeel characteristics, as will be described in more detail.

Generally, such food products may comprise from about 0.25 to about 4 weight percent of dispersed, porous, particulate, microreticulated microcrystalline cellulose, from about 50 to about 99 weight percent of water, from about 1 to about 35 weight percent digestible carbohydrates, from about 0 to about 10 weight percent protein, and less than about 7 weight percent of digestible triglycerides. As indicated, the microreticulated microcrystalline cellulose is particulate, and has a particle size distribution such that substantially all (ie, at least about 75 weight percent) of the microreticulated microcrystalline cellulose particles have a maximum dimension of less than about 25 microns. The microreticulated microcrystalline cellulose particles are porous, and in this regard, have a void volume of at least about 25 volume percent, preferably at least about 50 volume percent of the particles. The microreticulated microcrystalline cellulose particles of the high viscosity aqueous dispersions are believed to be an intimately interconnected product of microfragmented microcrystalline cellulose which has reagglomerated under controlled conditions to form stable, porous particles formed of microcrystalline particle fragments which are connected at spaced-apart zones of contract through crystalline bonding forces. The microreticulated particles of the aqueous dispersion desirably have a mean particle size in the range of from about 2 to about 25 microns, and desirably, at least about 50 percent by weight of the microreticulated microcrystalline cellulose particles of the aqueous dispersion have a maximum linear dimension in the range of from about 2 to about 25 microns and preferably in the range of from about 5 to about 20 microns.

It is important that the microreticulated cellulose be prepared from the highly crystalline microcrystalline cellulose. Microcrystalline celluloses are conventionally prepared from wood pulp by acid hydrolysis of cellulose fiber which weaken the disordered para-crystalline region. Subsequent shearing releases the insoluble, highly crystalline cellulose bundles. [Thomas, W. R., "Microcrystalline Cellulose (MCC or Cellulose Gel)", Food Hydrocolloids, Vol. III (ed. M. Glickman), pp. 9–42 (1986), CRC Press, Inc., Boca Raton, Fla.; "Avicel Microcrystalline Cellulose—Product Description", Technical Bulletin G-34, FMC Corporation, Food & Pharmaceutical Products Division, Philadelphia (1985)]. Cellulose is a linear polymer of $\beta$1-4 linked D-glucose units. Because of the linear nature of cellulose which allows close contact of adjacent chains, as well as an abundance of hydroxyl groups available for hydrogen bonding between chains, cellulose readily forms bundles of molecules which further interact to form fibrils. Although much of the cellulose found in nature is arranged in tightly packed crystalline regions, these are interspersed with less densely packed amorphous areas, called para-crystalline regions. In the typical manufacture of microcrystalline cellulose, acid hydrolysis is utilized to attack the para-crystalline regions, followed by a process of attrition (a high shear treatment), to break out the microcrystalline regions. Because of their highly crystalline nature, the microcrystalline cellulose particles have a strong tendency to recrystallize after being broken apart.

In the formation of the microreticulated microcrystalline cellulose materials, it is believed that the generally solid microcrystalline cellulose crystallites are progressively converted to porous microreticulated particles of specific size distribution by a process of controlled microfragmentation and reagglomeration.

Microreticulated microcrystalline cellulose dispersions may be produced by providing an aqueous suspension of a microcrystalline cellulose comprising from about 90 to about 99 percent water and from about 1 to about 10 weight percent microcrystalline cellulose, and preferably from about 5 to about 9 weight percent of microcrystalline cellulose, based on the weight of the aqueous dispersion. The aqueous dispersion should not contain materials such as gums which prevent recrystallization of cellulose fragments. The solid microcrystalline cellulose particles may desirably have a mean particle size in the range of from about 5 to about 40 microns, such as in the range of from 20 to 30 microns. The aqueous microcrystalline cellulose dispersion is repeatedly conducted through a superpressure, high shear zone to fragment the microcrystalline cellulose to crystalline fragments having a maximum dimension of less than about 1 micron, and reagglomerating the sub-micron crystalline fragments under high shear conditions at a very small turbulence scale, to produce porous microreticulated microcrystalline cellulose particles having the desired particle size distribution. By "superpressure high shear zone" is meant a shear zone operated at a driving pressure drop of at least 12,000 psi which is dissipated viscously to heat. As indicated, the material is repeatedly conducted through the superpressure high shear zone. In this regard, the material should best be conducted at least twice, and preferably at least three times through a high shear zone.

The microcrystalline cellulose should best be conducted through a high shear zone having a shear rate of at least about $5 \times 10^6$ (e.g., $1 \times 10^7$) seconds$^{-1}$ at a specific turbulent energy dissipation rate of at least about $8.5 \times 10^5$ ergs per cubic centimeter of the high shear zone. Preferably, all of the microcrystalline cellulose slurry is conducted serially through the superpressure high velocity and shear fragmentation zone, so that all of the material which has passed through one stage of processing is conducted to the next stage of processing. However, processing may also be carried out by recycle in a stirred tank reactor mode, which however is not as efficient. In a flow through system with continuous high shear treatment, the specific energy requirement (the energy dissipation rate per unit throughput of product stream) may desirably be at least about $1 \times 10^8$ ergs per gram. Preferably, a turbulent energy dissipation rate of at least about $4 \times 10^{11}$ ergs per pound of aqueous dispersion is provided per pass through the high shear, high velocity zone. The kinetic and shearing forces are dissipated and converted viscously to heat and fragmentation of the microcrystalline cellulose, and the temperature of the dispersion should rise at least about 30° C. upon conduction through the superpressure microfragmentation zone.

The superpressure high shear zone should best have a shear rate of at least about $1 \times 10^7$ inverse seconds, with a turbulent energy dissipation rate sufficient to raise the temperature of the suspension at least about 30° C. through viscous dissipation of input energy to heat.

As indicated, microreticulated microcrystalline cellulose dispersions may be prepared by subjecting an aqueous slurry or suspension of the microcrystalline cellulose to intense shear at very high driving pressures to provide the microfragmentation and microporous reagglomeration treatment. Effective results have been achieved by using a CD30 or CD150 homogenizer (A. P. V. Gaulin Corp., Boston, Mass.) or a Rannie homogenizer (A. P. V. Rannie, Copenhagen) using a knife edge homogenization element within a closely surrounding impact ring at an inlet pressure of at least about 12,000 psig and preferably at least 13,000 psig, to obtain microporously reagglomerated microfragments having a mean particle size in the range of from about 5 microns to about 15 microns in maximum dimension.

Figure 1:
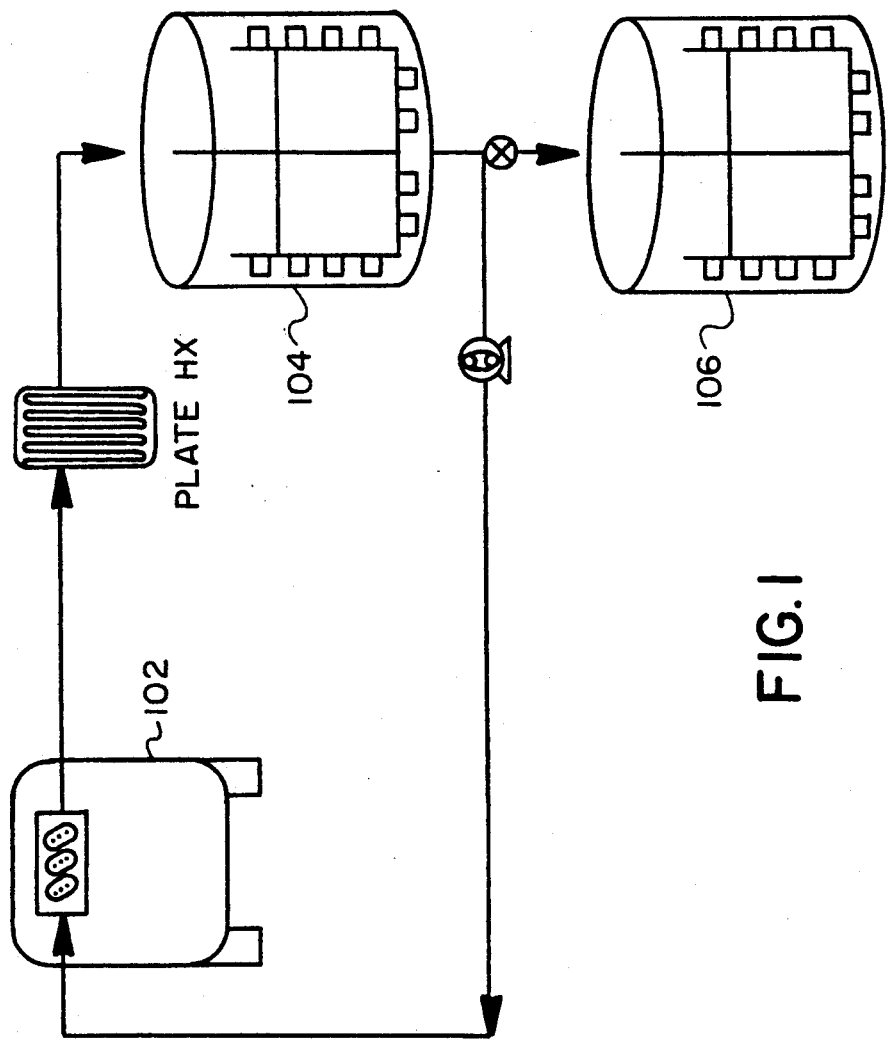
FIG. 1 is a schematic diagram illustrating a specific embodiment of a multiple pass continuous method of the continuous stirred tank reactor type for manufacture of a microreticulated microcrystalline cellulose aqueous dispersions which may be utilized in the preparation of low-fat or substantially fat-free food products having creamy, organoleptic characteristics.

Microreticulated microcrystalline cellulose is currently fragmented using homogenizers in either a volumetric or series pass set-up. Using the volumetric pass set-up, as shown in FIG. 1, the microcrystalline cellulose slurry travels in a loop between the superpressure microreticulation device 102, which may be a CD-30, CD150 or Rannie homogenization apparatus at high driving pressure (e.g., 13,500 psi) provided homogenizer 102 and the hold tank 104. "Pass" times or effective number of passes through the superpressure microfragmentation zone are calculated based on the volume of the batch and the flow rate of the material, with time for one pass being equivalent to the time it takes for the entire volume to be conducted through the superpressure shear zone at the treatment flow rate. Upon completion of a desired number of volumetric passes, the microreticulated material in the tank 104 may be conducted to food product preparation tank 106 where the microreticulated microcrystalline cellulose dispersion may be mixed with xanthan gum to coat and stabilize its microreticulated particles, and may subsequently be blended with selected food components to prepare a low fat or substantially fat-free food produced having smooth, creamy fat-like organoleptic characteristics. In the series pass set-up, the material passes through each homogenizer (up to 6) only once. The pass number is equivalent to the number of homogenizers operating.

Illustrated in FIG. 7 is volumetric pass data utilizing three different homogenizers as microfragmentation apparatus 102. The apparatus are of three different sizes, from the Gaulin CD30 shown as #1, the somewhat larger Gaulin CD150 shown as #2, and a productions scale Rannie (smallest to largest) shown as #3. The microreticulated cellulose product used was the PH101 product of FMC Corporation, which is substantially pure microcrystalline cellulose. Processing temperatures using this set-up average 70° F. at the homogenizer inlet and 110° F. at the outlet (a plate heat exchanger cools the microcrystalline cellulose material between passes), and a solids level of 6.5-7 weight percent. These homogenizers utilize a knife-edge valve and seat high pressure shear homogenization valve arrangement as shown in cross-section through the axis of rotation of FIG. 3. The aqueous dispersion enters the valve at a pressure P1 of over 13,000 psi, and is forced at high velocity which may exceed 1300 feet per second, through the gap between the knife edge valve 302 and seat 304, which are preferably of extremely hard and wear resistant ceramic. From the data, it is apparent that the smaller homogenizers provide the more efficient fluidization of microreticulated microcrystalline cellulose.

Figure 4:
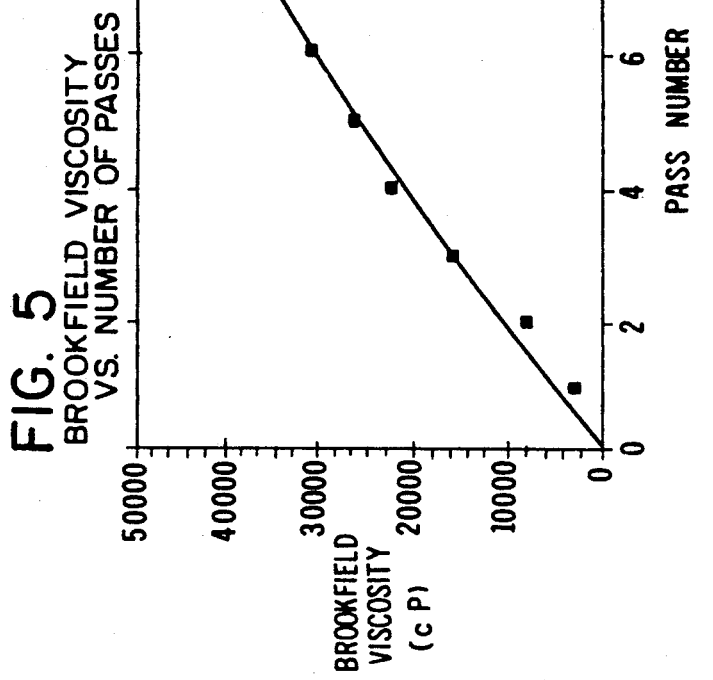
FIG. 4 is a graph of the median particle size of three samples of a microcrystalline cellulose slurry as it is being microreticulated in apparatus like that of FIG. 1.

Illustrated in FIG. 4 is a graph of median particle diameter for three separate sample runs in a volumetric recycle pass system of FIG. 1 for microcrystalline cellulose [PH101 microcrystalline cellulose product of FMC Corporation] illustrating the relatively constant particle size of the microreticulated microcrystalline cellulose particles which are formed, with increasing number of effective passes through the superpressure shear zone. However, although the particle size is not reduced in proportion to the number of passes, the viscosity continues to increase.

Figure 5:
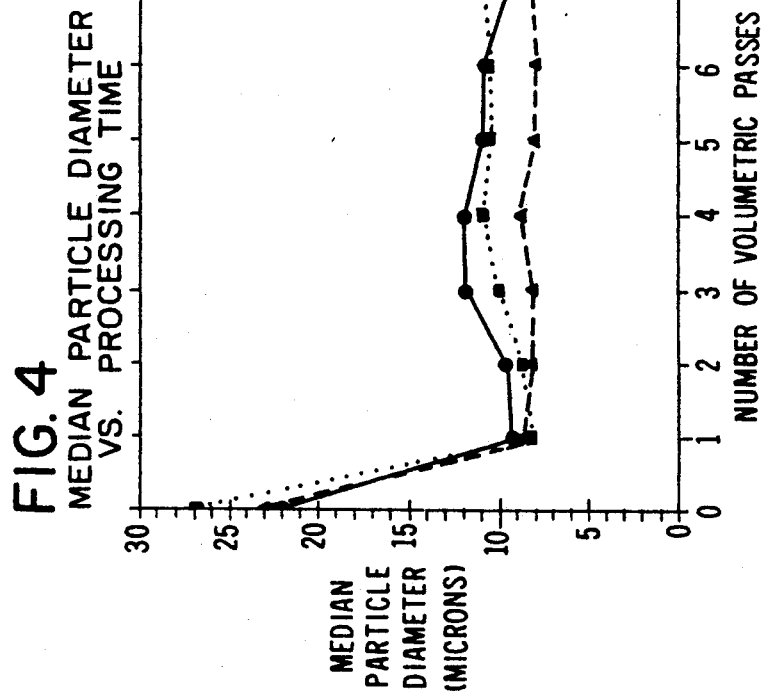
FIG. 5 is a graph of the Brookfield viscosity of a microcrystalline cellulose slurry as a function of the number of volumetric passes through a microreticulation apparatus of the type illustrated in FIG. 1.

FIG. 5 is a graph of Brookfield viscosity of a PR101 microcrystalline cellulose slurry as a function of number of volumetric passes measured by Brookfield RVD instrument at 10 rpm using Helipath T-bar B spindle. A similar combined graph illustrates the particle size by line 602, and viscosity by line 604, of an Avicel PH101 microcrystalline cellulose suspension at 7.2 weight percent suspension in water as shown in FIG. 6.

FIG. 9 is a graph of the concentration dependence, at 8 passes through CD150 apparatus in a recirculation system like FIG. 1, of the microreticulated Avicel PR101 microcrystalline cellulose.

The highly fragmented output stream from each of the production scale Rannie homogenizers 602-610 is directed to a subsequent homogenizer without recycle of the material. The output stream from the final homogenizer 612, after passing through heat exchanger 624 may be conducted to a vortexing mixer 640 such as a Breddo mixer, which continuously renews the surface 642 of the microreticulated microcrystalline cellulose 644 therein by means of a shearing, vortexing circulation pattern. A gum such as xanthan gum 646 may be continuously fed by an auger feeder 648 to a vibrating plate to disperse the gum powder in air, for introduction to the surface 642 and consequent formation of a stabilized, xanthan-coated and stabilized microreticulated microcrystalline cellulose fat substitute material 660, which may be introduced into a food preparation vessel 662 for blending with other food ingredients of a low-fat or fat-free food product.

Figure 2:
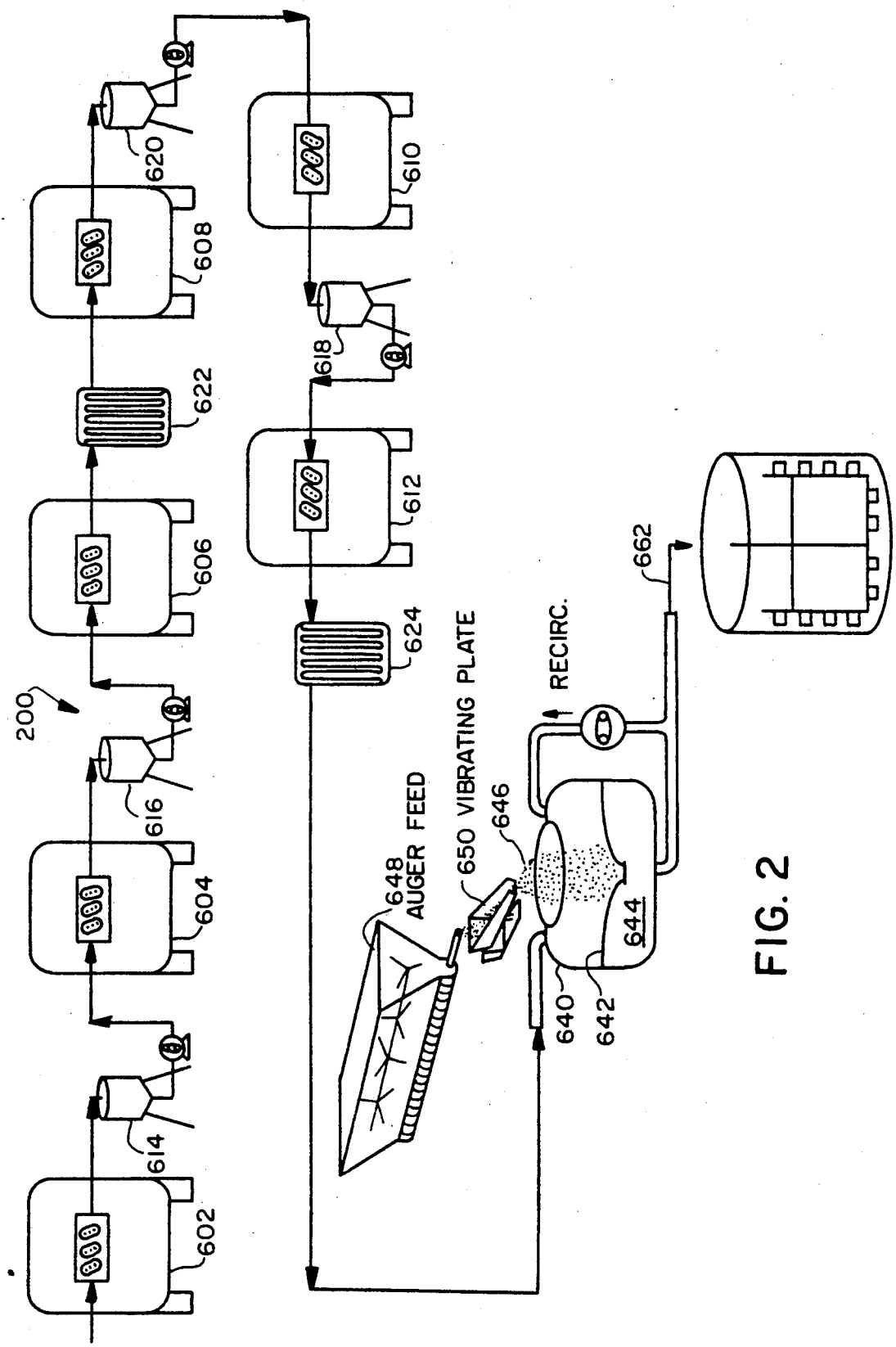
FIG. 2 is a schematic diagram illustrating a specific embodiment of a discrete, serial multiple pass method for manufacture of microreticulated microcrystalline cellulose aqueous dispersions which may be utilized in the preparation of low-fat or substantially fat-free food products having creamy, organoleptic characteristics.

Illustrated in FIG. 8 is a graph depicting the viscosity of microreticulated microcrystalline cellulose dispersions (prepared from Avicel PR101 microcrystalline cellulose at a solids level of about 7 weight percent) as a function of the number of series passes through the production Rannie homogenizers 602-612 of FIG. 2. By comparing FIG. 8 with FIG. 7, curve #3 for the same Rannie homogenizer operated in recyclic continuously stirred tank mode, it will be seen that the series operation without recycle as shown in FIG. 2 is much more efficient than recycle operating as shown in FIG. 1.

Illustrated in FIG. 2 is a series pass embodiment 200 of a processing system for manufacturing microreticulated microcrystalline cellulose. In the embodiment 200, an array of superpressure microfragmentation homogenizers 602, 604, 606, 608, 610 and 612 are connected in series through respective reservoir tanks 614, 616, 618 and 620 and heat exchangers 622, 624.

In operation of the FIG. 2 systems, the processing temperatures increase with each pass in this set up: starting at 60° F. at the inlet to homogenizer 602 and increasing 40° F. with each pass through successive homogenizers 604, 606. Plate heat exchangers 622, 624 after the third and sixth pass cool the microreticulated microcrystalline cellulose dispersion back to 60° F., insuring that the temperature never exceeds 195° (outlet temperature of homogenizers 606, 612) in the illustrated embodiment. Comparing the Rannie data from both processing set-ups, it is apparent that series passes build the microreticulated microcrystalline cellulose viscosity more quickly than the volumetric set-up.

The main mechanism responsible for the breakage of microcrystalline cellulose crystals is high speed shear and direction change. In a production scale machine, the material is processed traveling at a flow rate of approximately 900 gal/hr. After being forced and sheared through a 0.0014 inch gap (FIG. 3) under 13,500 psi pressure P1, the microcrystalline cellulose dispersion reaches velocities of 1,000 ft/sec or more (v2 on diagram of FIG. 3). The microcrystalline cellulose dispersion is forced to abruptly change direction by the surface of the stream impact ring 306 at such high velocity, resulting in the division of microcrystalline cellulose crystals and the generation of crystallite fragments which may recrystallize imperfectly in a reticulated, porous structure, thereby building the microreticulated microcrystalline cellulose viscosity.

Full hydration of the starting material is an important step for obtaining the desired fat-like, microreticulated microcrystalline cellulose functionality. The microcrystalline cellulose may desirably be boiled in aqueous suspension or may be heated during microfragmentation treatment by allowing the temperature to rise through input energy dissipation in the aqueous dispersion.

Viscosity in a solution or suspension of cellulose materials is controlled by many factors. In conventional, solid colloidal microcrystalline cellulose suspensions, viscosity is related to the number and size of solid crystallites in the suspension. Colloidal grades of products comprising such crystallites are typically protected by an anionically charged layer of carboxymethyl cellulose and are thus prevented from aggregation by charge repulsion. As the particle size of colloidal microcrystalline cellulose is reduced by high pressure homogenization, the number of individual crystallites increases, the total exposed surface area increases, and the viscosity increases proportionally. This explanation does not hold true for superpressure high shear fragmentation of microcrystalline cellulose suspensions which do not have a protective colloid to prevent reagglomeration, under appropriate processing condition as described herein. In this case the apparent particle size remains relatively the same, but the viscosity continues to increase with increasing superpressure microfragmentation/reagglomeration treatment.

Figure 10A:
FIGS. 10A and 10B are scanning electron micrographs of a hydrated microcrystalline cellulose product before microreticulation treatment, at two different magnifications.
Figure 10B:
Figure 10C:
FIG. 10C is a scanning electron micrograph of two crystals illustrating a fuzzy surface after 1 pass through the fluidizer.
Figure 10D:
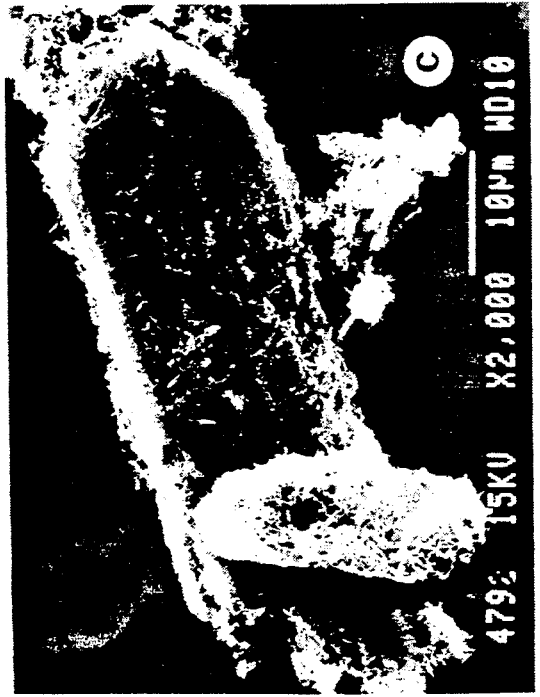
FIG. 10D is a higher magnification scanning electron micrograph of the crystal surface of the hydrated microcrystalline cellulose illustrating the shape and size of microcrystals which have been dislodged from the larger crystal.

In this regard, initially the microcrystalline cellulose material is in the form of very densely-packed solid crystalline cellulose particles, which may have an average particle length of, for example, 20 to 30 $\mu$m (longest dimension, e.g., when measured by a particle size analyzer such as a MicroTrac Particle Analyzer), but with many particles as large as 200 $\mu$m by light microscopy, and a very low viscosity. After 1 or 2 passes through a superpressure high shear homogenizer, there are many isolated crystallites (about 1×0.1 $\mu$m) but still mostly densely packed solid crystals (about 10 $\mu$m in their longest dimension). The viscosity is still low, as shown in FIGS. 5, 6 and 7. This progressive formation of microreticulated microcrystalline particles is illustrated in FIGS. 10-12. In this regard, FIGS. 10A and 10B are scanning electron micrographs of hydrated Avicel PR101 microcrystalline cellulose product starting material before passing it through a volumetric multi-pass superpressure homogenization treatment such as shown in FIG. 1, at two different magnifications. FIGS. 10C and 10D illustrate the surface of two microcrystalline crystals of the FIG. 10A material after one pass, at different magnifications, as shown by the length line marks.

Figure 11B:
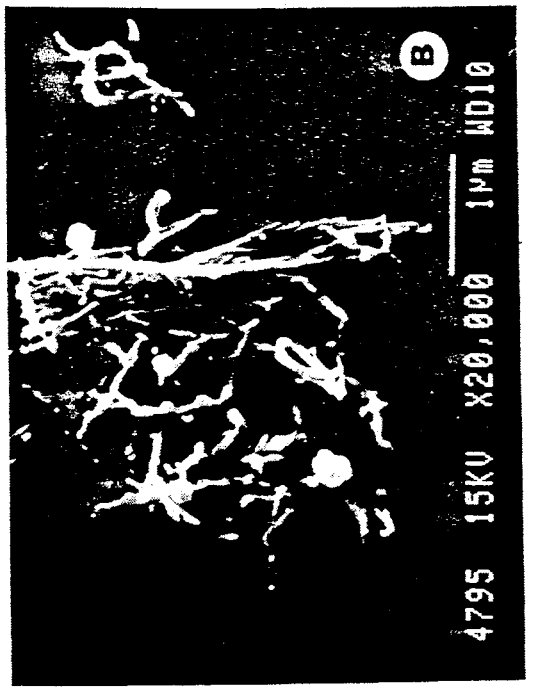
FIGS. 11A and 11B are scanning electron micrographs of the microcrystalline cellulose after 3 passes through microreticulation apparatus of the type illustrated in FIG. 1.
Figure 11D:
FIGS. 11C and 11D are scanning electron micrographs of the microcrystalline cellulose of FIGS. 10A–B after 7 passes through the microreticulation apparatus showing microcrystals and small crystals aggregated into a microreticulated structure.
Figure 11A:
Figure 11C:

FIGS. 11A and 11B are scanning electron micrographs of the material of FIGS. 10A, 10B after three passes through the microreticulation apparatus of FIG. 1, while FIGS. 11B and 11C illustrate the material after seven volumetric passes through the system of FIG. 1 showing the microfragments aggregated into a microreticulated structure.

Figure 13:
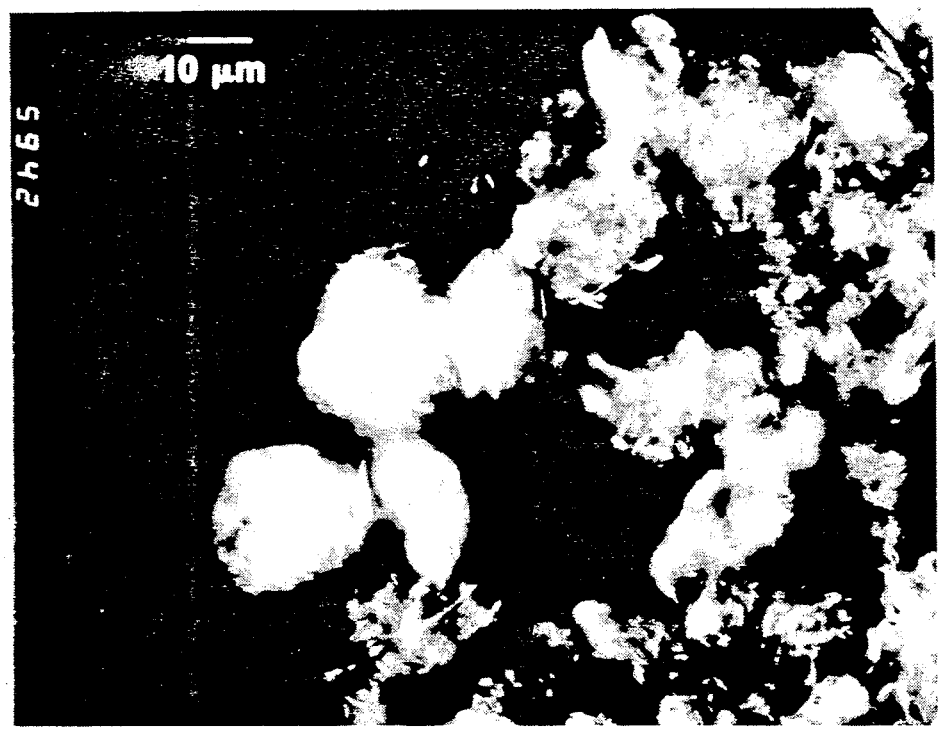
FIG. 13 is a light micrograph via darkfield optics of microreticulated microcrystalline cellulose.
Figure 14:
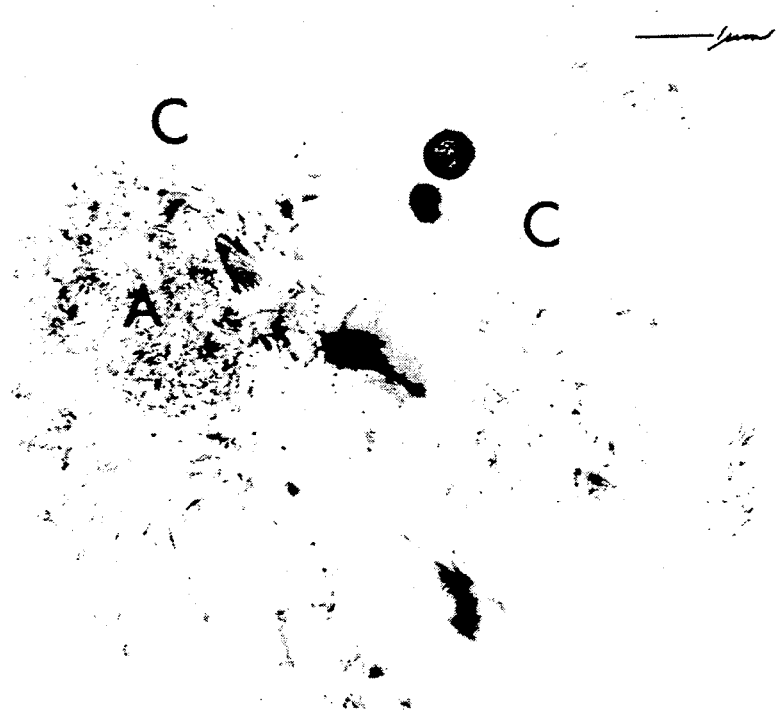
FIG. 14 is a transmission electron micrograph of pourable dressing made with a microreticulated microcrystalline cellulose aqueous dispersion, illustrating "clear" areas (c) devoid of microcrystalline cellulose with indications of spherical aggregations (a) of microcrystalline cellulose.

FIGS. 12A and 12B are cryoscanning electron micrographs made without chemical fixation or dehydration artifacts, revealing the open nature of the particles. FIG. 13 is a light micrograph of the microreticulated microcrystalline cellulose. FIG. 14 is a transmission electron micrograph of a pourable dressing of the type described hereinafter, with areas of microreticulated cellulose A separated by areas C which are devoid of the material.

As shown in these FIGURES, after multiple passes through the superpressure homogenizer at a small turbulence scale, microreticulated aggregates (which appear under microscopy to be like "cotton balls") of crystallites are apparent, with a particle size, for example, of 10 to 15 μm. Very few isolated submicron crystallites or dense crystalline particles can be seen. Embedded within the loose microreticulated "cotton ball" aggregates are bits and pieces of the dense crystalline cellulose particles, which have not yet completely dispersed. The viscosity at this point is high and continues to increase with increasing microfragmentation treatment.

It is believed that the microreticulated cellulose particles are formed by weak interactions between the individual crystallites as they are subjected to the turbulent flow through the homogenizer. The aggregates grow by increasing the number of associated crystallites until they reach an optimum size which may be related to the shear force through the homogenizer. These aggregates trap water by capillary action, thus driving up the viscosity. Submicron crystallites continue to shred off of the dense microcrystalline cellulose particles with each pass, and aggregate imperfectly with other crystallites to form a porous, reticulated network which is bonded with strong crystallization energy at the points of contact, and increase the total number of "cotton ball" aggregates available to absorb water. Eventually the entire continuous phase may be crowded with the aggregated microreticulated microcrystalline cellulose particles, even though the solids content is relatively low, and the viscosity becomes very high.

In a recent study on the coagulation of microcrystalline cellulose dispersions, Evans and Luner observed the behavior of microcrystalline cellulose in a turbulent field under relatively low shear conditions of 600 inverse seconds, in respect to the formation of microcrystalline cellulose flocs with a large, uniform aggregate diameter of about 200 μm [Evans, et al., "Coagulation of Microcrystalline Cellulose Dispersions", J. Colloid Interface Sci., 128, 464–476 (1989)]. Such large flocs would not be suitable for use as a fat-mimetic food component, but were described as resulting from the inherent colloidal instability of microcrystalline cellulose, which tends to aggregate by parallel alignment of the crystallites followed by hydrogen bonding of the cellulose molecules. In the absence of a turbulent field, cellulose crystallites tend to reform into very dense wood-like structures. In a turbulent field, the parallel alignment is prevented by interaction with other crystallites. The final particle size which is achieved by this process is determined by the lower size limit of the turbulent eddies. The aggregates will grow to this size, while larger aggregates will be disrupted. A very narrow particle size distribution would be predicted, and was found experimentally.

It is theorized that the particle size distribution of the microreticulated microcrystalline cellulose becomes relatively narrow during superpressure microfragmentation processing, and the particle size of the microreticulated particles plateaus after multiple passes. In the formation of fat-mimetic microreticulated microcrystalline cellulose, the size of the aggregated microcrystalline cellulose is much smaller than the one reported by Evans and Luner, due to the much higher shear force. The size of the turbulent eddies is believed to be somewhat less than 10 μm, roughly corresponding to the observed particle size distribution.

In any event, in preparing microreticulated microcrystalline cellulose, the microcrystalline cellulose dispersion may be passed through a cell disruptor or other high shear zone, a sufficient number of times to provide a microreticulated microcrystalline cellulose dispersion of desired particle size having a high viscosity. The microreticulated dispersion will desirably have a total solids content of the porous, microreticulated microcrystalline cellulose particles in the range of from about 5 to about 10 percent, and more preferably from about 6 to about 8 percent, by weight, solids basis, based on the total weight of the aqueous dispersion. Superpressure microfragmentation of microcrystalline cellulose dispersions over about 10 weight percent solids content may be difficult. If a low solids content dispersion (e.g., 5–1 weight percent) is formed by high pressure shearing, the resulting dispersion may be concentrated by ultrafiltration, thin film evaporation or centrifugation procedures, if desired. After concentration, these microreticulated microcrystalline cellulose dispersions are smooth, creamy, bland, white, and have a fat-like mouthfeel, and after treatment with an astringency reducing agent, can be used as a fat replacer in a variety of food products at very low solids content levels to provide substantially fat-free products. For example, frozen desserts and food dressing products prepared with from about 1 to about 3 weight percent of such microreticulated microcrystalline cellulose on a total solids basis are stable, smooth and creamy.

Microreticulated microcrystalline cellulose as prepared by superpressure microfragmentation under small macroscalar turbulence conditions may have an astringent or drying mouthfeel, which adversely affects food product acceptability. Further in accordance with various additional aspects of the present invention, the fat-mimetic characteristics of food products containing microreticulated microcrystalline cellulose may be enhanced by coating the surface of the microreticulated microcrystalline cellulose particles with an astringency control agent. An effective treatment is post-homogenization gum coating. In this regard, microreticulated microcrystalline cellulose may be combined with from about 5 to about 20 weight percent of an ionic or neutral gum, or mixture of gums, based on the total solids weight of the microreticulated microcrystalline cellulose in the aqueous dispersion. A number of anionic or neutral gums may be used including xanthan, carboxymethyl cellulose, carrageenan, alginate, locust bean gum, guar gum and mixtures thereof. The most effective gums are xanthan gum and carrageenan. For example, an aqueous microreticulated microcrystalline cellulose dispersion having a 2% to 10% microreticulated microcrystalline cellulose solids content may be mixed in a low shear mixer, such as a Hobart mixer or a Breddo mixer, with an amount of gum equal to 5% to 20% of the weight of the microreticulated microcrystalline cellulose dispersion. The gums may be sifted in dry to the microfragmented xanthan/protein complex dispersion as it is being mixed on the low shear device. It is theorized that allowing the gums to hydrate in contact with the complex allows the gums to interact and coat the microreticulated microcrystalline cellulose in a particularly effective manner.

By "xanthan gum" is meant the heteropolysaccharide produced by fermentation of the microorganism of the genus Xanthomonas. A discussion of the physical and chemical properties may be found in Industrial Gums, R. L. Whistler, Ed., Academic Press, N.Y. (1973), p. 473.

Xanthan gum in aqueous solution with an appropriate counterion such as sodium or potassium is highly negatively charged because its side chains are composed of charged glucuronic acid, mannose and its pyruvate derivative. In aqueous solution, the highly charged mutually repelling and relatively bulky side chains, which are regularly disposed along the relatively narrow backbone, are believed to provide hydrated xanthan gum with a relatively linear structure, which is further believed to be an important factor in the provision of the desirable properties and functionality of the preferred microreticulated microcrystalline cellulose dispersions which include xanthan gum, and food products containing such dispersions, as will be further discussed.

Carrageenans are structural polysaccharides of red sea plants such as *Chondus crispus* and *Gigartina stellata*. There are several varieties of carrageenans which may be extracted from red sea plants for food use, including kappa, lambda and iota carrageenans. Carrageenans are strongly charged anionic polyelectrolytes of high molecular weight and regular configuration which have anionic sulfate ester groups regularly disposed along a polysaccharide backbone. Lambda carrageenan has a general linear structure having substantially three pendant sulfate groups for each two monosaccharide groups along the polymer backbone.

Kappa carrageenan and iota carrageenan have significantly less ester sulfate than lambda carrageenan, with iota carrageenan having approximately one sulfate group per monosaccharide group, and kappa carrageenan having approximately one sulfate group for each two monosaccharide group along the backbone. A discussion of the physical and chemical properties of lambda carrageenan may be found in Industrial Gums, R. L. Whistler, Ed., Academic Press, N.Y. (1973).

Addition of gum to the aqueous microreticulated microcrystalline cellulose dispersion has several purposes. Coating with gum has the qualities of improving mouthfeel, improving texture, mitigating undesirable flavors and sensations, and improving stability.

It is important to add the gum without clumping or aggregation so as to form a well mixed dispersion. The gum is desirably added directly, in dry form, to the highly viscous microreticulated microcrystalline cellulose aqueous dispersion under conditions of vortex shear.

The key process steps are (1) delivery of the gum to a power metering device without introducing moisture to the gum (2) dispersing the gum powder in air such that it falls towards the vortexing surface of the microreticulated microcrystalline cellulose dispersion, (3) rapid wetting of each gum particle and, (4) thorough mixing of the dispersion. In this way the gum particles are separated from one another and kept that way until they are wetted and dispersed in liquid. At that point there is no danger of clumping. Intimate mixing between the gum and microreticulated microcrystalline cellulose takes place simultaneously with hydration of the gum in the aqueous dispersion.

Post-homogenization coating of the aggregated microcrystalline cellulose with gums such as xanthan, carrageenan, or carboxymethyl cellulose is believed to stabilize the microreticulated microcrystalline cellulose structures in their interlocked network geometry and particle size distribution, and prevent further agglomeration. The charged layer of gum keeps the aggregates dispersed in food products prepared using the microreticulated cellulose dispersions, while improving their mouthfeel. Micrographic evidence which demonstrates that these "cotton ball" aggregates persist in food products, and appear to function as units of fat substitute functionality. Additional advantages of post-homogenization gum coating include exceptional smoothness, prevention of mouth-drying sensations, and minimization of cardboard or paper-like off-flavors.

The particle size distribution of the predominant proportion of the microreticulated microcrystalline cellulose particles (e.g., 8 to 12 $\mu$m) is on the order of the size of emulsified fat droplets in many products. For example, butterfat droplets in milk may average about 4 $\mu$m. In viscous dressings, such as mayonnaise or salad dressing, the average droplet size may typically be about 10 $\mu$m. The porous microreticulated microcrystalline cellulose aggregates may be able to mimic fat in many products because they form structures which are about the same size as fat droplets. Moreover, they have a resiliency by virtue of their microreticulated structure which prevents the sensation of hard gritty particles, and which produces a high degree of functionality for a relatively small amount of the material. The functionality of the microreticulated microcrystalline cellulose material is believed to result from its ability to mimic the functionality of fat by not only providing viscosity enhancement to a food product, but also by imparting a unique, creamy, fat-like mouthfeeling.

The porous microreticulated microcrystalline cellulose particles may also be coated with an agent such as an edible fatty emulsifier such as stearoyl lactylate, monoglycerides or lecithin, a triglyceride, or mixtures thereof to provide fat-mimetic characteristics, and reduce astringency. Suitable lipids include mono, di and triglycerides, purified lecithin, sodium or calcium stearoyl lactylate, polyglycerol esters, propylene glycol esters, lactylated monoglycerides or PGME's, sucrose esters, diacylactylic esters of glycerides or ethyoylated monoglycerides. Distilled monoglycerides provide a creamy mouthfeel and a bland flavor. Sodium stearoyl lactylate gave a very creamy yogurt texture and mouthfeel with a slightly burnt caramel flavor. Such coatings may provide substantially reduced mouth drying and astringency when compared to a microcrystalline cellulose control.

An all natural coating may be produced using a natural lecithin as a coating lipid. Other materials that could produce superior lipid coatings would be distilled monoglycerides.

Such microreticulated microcrystalline cellulose dispersions have particularly desirable shelf-life, thermal, pH and dispersion stability, and a very high functionality to weight percent of solids ratio together with smooth, creamy texture and mouthfeel characteristics, and a bland taste which is generally compatible with a wide variety of food products.

Low fat or substantially fat-free food products comprising such microreticulated microcrystalline cellulose dispersions may be provided which have novel and particularly desirable characteristics, as will be more particularly described hereinafter. Such products may comprise from about 0.25 to about 4 percent by weight (solids basis) of the microreticulated microcrystalline cellulose dispersion, which is desirably stabilized in microreticulated form with up to about 20 weight percent, based on the weight of the microreticulated microcrystalline cellulose, of xanthan gum. The food products further desirably comprise from about 40 to about 95 percent by weight moisture, from about 0 to about 50 percent carbohydrate, from about 0 to about 35 percent by weight protein and from about 0 to about 7 percent by weight of fat, as well as salt, flavoring agents and other food components. Various specific food applications will be described in more detail hereinafter.

Having generally described manufacture of microfragment dispersions, various aspects of the invention will be further described with respect to methods and apparatus schematically illustrated in FIG. 2. As shown in FIG. 2, an aqueous dispersion of microcrystalline cellulose may be prepared by dispersing microcrystalline cellulose in a suitable blending mechanism to provide an aqueous microcrystalline cellulose dispersion having about 7 weight percent total solids, which may be in a cooker and subjected to microfragmentation in aqueous slurry by means of high shear devices 602, 604, 606, 608, 610, 612, which is conducted to a vortex mixer 640. Xanthan in powder form is metered onto the vibrating plate disperser 650 by an auger type metering device such as a salt and gum feeder 648.

A vibrating plate device 650 such as a flat plate held at a very sight angle to perpendicular which vibrates such that the gum powder falls in a dispersed fashion from the end of the plate towards the liquid may be used.

A sifting screen device may also be used as a means of dispersing the xanthan gum powder in air. The screen mesh may have openings slightly larger than the size of the gum particles may be moved at a speed of 30–120 cycles per minute in a circular motion or back and forth in the horizontal plane. The amplitude of the motion may in general be small, around two inches or less.

The mixing tank 640 should be capable of moving a highly viscous fluid at such a rate as to always present a surface without gum accumulation so that the individual gum particles can be rapidly wetted. The tank should create a vortex in the highly viscous fluid and the gum may desirably meet the liquid surface at the vortex for maximum effectiveness; however, the gum should not fall precisely in the center of the vortex. It then mixes the gum which is primarily on the surface so as to be homogeneous throughout the mixture in a rapid fashion and to allow uniform levels of microcrystalline cellulose coating. Impeller type tanks (Breddo, Crepaco, etc) have been used successfully for this purpose. A recirculation pump may be used to provide better mixing.

The gum hydrates and coats the microreticulated microcrystalline cellulose after it is well mixed with the microreticulated microcrystalline cellulose and available water. The rate of hydration depends on the shear rate and the amount of available water in the microreticulated cellulose which is determined by the amount of microfluidization the microcrystalline cellulose undergoes. The mixture should be hydrated before it is used in a product in order to allow the maximum coating action.

As indicated, frozen desserts incorporating microreticulated microcrystalline cellulose may be provided which have desirable organoleptic properties. Typically, in conventional frozen dessert formulations, the higher the fat level in a frozen dessert, the more pleasing and appetizing is its texture and flavor. For example, ice cream, which usually comprises at least about 10 percent of milk fat, typically has texture and flavor superior to the texture and flavor of frozen desserts comprising low proportions of fat. However, the higher the fat content of the frozen dessert, the higher is the calorie content of the frozen dessert. Nutritious, low calorie, low fat or substantially fat-free frozen desserts having desirable texture and flavor characteristics similar to higher fat content desserts, and having substantial shelf and flavor stability, together with a creamy texture may be provided in accordance with the present disclosure. Such frozen desserts may comprise from about 0 to about 2 percent of edible fat, from about 1 to about 3 percent of a microreticulated microcrystalline cellulose (dry basis), from about 2 to about 8 percent by weight of protein (dry basis), from about 10 to about 30 weight percent of a saccharide component comprising one or more sugars, and from about 45 to about 80 percent water. Various gums, stabilizers and emulsifiers, flavoring agents and flavoring food components may also be included, in accordance with conventional practice. From about 0 to about 20 weight percent of low (15-28) DE corn syrup solids may be utilized to assist in the provision of a well rounded or creamy texture.

In preparing such frozen desserts, a mix is prepared which comprises an aqueous component, and optionally a very small amount of a fat component. The fat component comprises about 2 percent or less of the mix, and may be any edible fat which is firm but spreadable at room temperature, such as milk fat.

The aqueous component will ordinarily comprise water, protein and sweetening agents and may also comprise stabilizers and flavoring ingredients. The cellulose component (and the optional fat component, if utilized) may be thoroughly mixed with the other components, and the mix may be homogenized to provide a thoroughly homogenized composition which may then be subjected to aeration and freezing in a conventional manner, as by a swept surface heat exchanger.

The frozen dessert mix may be packaged and hardened after discharge from the heat exchanger to provide a low-fat frozen dessert having excellent creamy texture and flavor together with reduced calorie content in a reduced fat or fat-free composition.

The microreticulated microcrystalline cellulose dispersions are also particularly useful as components of low oil or oil-free food dressings, such as salad dressings, viscous and pourable dressings. Shelf stable acidic food dressings comprising microreticulated microcrystalline cellulose dispersions are particularly desirable, comprising a blend of an acidic aqueous fluid food dressing vehicle having a pH of less than about 4.1 and a creamy-textured microreticulated microcrystalline cellulose component which retains its stability in the acidic food dressing vehicle. The shelf-stable food composition will generally comprise from about 0.25 to about 4 percent by weight, and preferably from about 2 to about 3 percent by weight of the microreticulated microcrystalline cellulose dispersion (solids basis), from about 0 to about 7 percent and preferably less than about 4 percent by weight of an edible oil or fat, and from about 50 percent to about 99.75 percent by weight, and preferably from about 90 percent to about 99 percent by weight of the aqueous fluid food dressing vehicle, based on the total weight of the food dressing. Up to about 20 weight percent of other components, such as flavoring materials and particulate food components, may be included in the dressing.

The food dressing vehicle utilized in accordance with the present invention will generally contain from about 20 to about 96 percent by weight of water, and sufficient acidifying agent to provide the aqueous component of the dressing vehicle with a pH of less than 4.1, and preferably in the range of from about 2.75 to about 3.75. In accordance with conventional food dressing manufacture, depending on the desired pH, the amount of water in the dressing vehicle and the effect of additional components of the food dressing, the acidifying agent which may include acetic acid or a mixture of acetic and phosphoric acids, will generally be present in an amount of from about 0.1 to about 3.5 weight percent based on the total weight of the food dressing vehicle.

Also in accordance with conventional dressing manufacture, the food dressing vehicle may contain up to about 20 weight percent of a bodying agent such as gums, starch or other hydrocolloids and mixtures thereof, from about 0 to about 5 percent salt, from about 0 to about 30 percent sweetener, and from about 0 to about 15 percent spices and flavors, based on the total weight of the food dressing vehicle. The food dressing vehicle which may be utilized includes oil-less dressings, pourable or viscous dressings and emulsified or nonemulsified food dressing products of the type commonly used as an adjunct on salads, vegetables, sandwiches and the like. Included within such classification are products such as fat-free mayonnaise, salad dressing and French dressing, and imitations thereof including condiments or reduced calorie products.

The oil, to the extent used in the dressing formulation, may be any of the well known edible triglyceride oils derived from oil seeds, for example, corn oil, soybean oil, safflower oil, cottonseed oil, etc., or mixtures thereof. The sweetener used is typically sucrose. However, other sweeteners such as dextrose, fructose, corn syrup solids and synthetic sweeteners may also be utilized.

Low DE corn syrups are a particularly desirable component of such fat-free dressing formulations. An important component of the substantially fat-free dressings is a low dextrose equivalent corn syrup component in specific proportions having a dextrose equivalency in the range of from about 15 to about 28, and preferably in the range of from about 20 to about 25. Such 15-28 DE corn syrup solids may be provided by acid, enzyme, or acid-enzyme hydrolysis of corn starch. The dextrose equivalent (DE) value may be calculated according to the formula $DE=100/(M_n/180.16)$ where $M_n$ is the number average molecular weight of the corn syrup solids. A substantial proportion of such low 15-28 DE corn syrup solids may be provided in the pourable dressing products in in order to provide maximum benefits. In this regard, the pourable dressing may desirably comprise from about 10 to about 25 weight percent, and preferably in the range of from about 14 to about 21 weight percent of such 15-28 DE corn syrup solids based on the total weight of the pourable dressing product. The low dextrose equivalent corn syrup solids are believed to provide the pourable dressing product with more pleasing fat-mimetic characteristics, and to ameliorate adverse organoleptic characteristics of the microreticulated microcrystalline cellulose component.

The 15-28 dextrose equivalent corn syrup component provides a substantial improvement in the textural organoleptic properties of the microreticulated microcrystalline cellulose-containing food products, and in combination with the microreticulated microcrystalline cellulose component, provides a more rounded flavor profile, a more creamy character, and also reduces mouth coating, astringency and related lingering or undesirable aftertastes which could otherwise be present at the level of microcrystalline cellulose use employed in the food dressing products.

Small amounts of any suitable emulsifying agent may be used in the salad dressing compositions of the invention. In this connection, egg yolk solids, protein, gum arabic, carob bean gum, guar gum, gum karaya, gum tragacanth, carrageenan, pectin, propylene glycol esters of alginic acid, sodium carboxymethyl-cellulose, polysorbates and mixtures thereof may be used as emulsifying agents in accordance with conventional food dressing manufacturing practices.

A bodying agent may be used in the food dressing vehicle to provide desired body or viscosity in accordance with conventional practice, in addition to the xanthan/protein complex dispersion (which serves as a creamy functional bodying agent). This bodying agent may be a starch paste or may comprise an edible gum such as xanthan gum (as a bodying agent, not as part of the molecularly intimate xanthan/protein complex), guar gum, propylene glycol ester of alginic acid or the like. Starch, if used, may typically be present at a level of from about 2 percent to about 10 percent. The edible gum will typically be present at lower levels to provide desired body and texture.

Starch paste is generally used as a bodying agent in the preparation of semisolid emulsified oil dressings, such as salad dressing, and may be used in the preparation of pourable emulsified oil dressings, such as French dressing. The starch may be utilized at a level of from about 1 to about 10 percent by weight in semisolid dressings and at a level of from 0 percent to about 8 percent in pourable dressings. Any suitable starch containing material may be used, and in this connection, any food starch, whether modified, unmodified or pregelatinized, tapioca flour, potato flour, wheat flour, rye flour, rice flour or mixtures thereof may be used as a bodying agent in the preparation of food dressing vehicles. Similarly, the bodying agent may comprise edible gums individually or in combination, and the gums will usually provide the desired body and texture at levels below those normally required when starch paste is used. The gums, when used as a bodying agent, may typically be present at a level of between about 0.05 percent and 2.5 percent. Various other ingredients, such as spices and other flavoring agents, and preservatives such as sorbic acid (including salts thereof) may also be included in effective amounts.

The dressing vehicle may have an aqueous pH of about 4.1 or lower, preferably in the range of from about 2.75 to about 3.75. Any suitable edible acid or mixture of acid may be used to provide the desired level of acidity in the emulsified dressing, with suitable edible acids including lactic acid, citric acid, phosphoric acid, hydrochloric acid, and acetic acid and mixtures thereof. Mixtures of acetic acid and phosphoric acid are particularly preferred acidifying agents. The amount utilized to achieve a desired pH will depend on a variety of factors known in the art including the buffering capacity of protein components of the dressing.

The microreticulated microcrystalline cellulose dispersion is an important component of the food dressings, and may be blended with the other dressing ingredients in the form of a hydrated, xanthan gum-coated aqueous dispersions as previously described. Such hydrated aqueous microreticulated microcrystalline cellulose/xanthan dispersions may typically comprise from about 88 to about 95 percent water, and from about 5 to about 10 percent by weight of the microreticulated microcrystalline cellulose, and from about 0.5 to about 2 weight percent of xanthan gum.

Having generally described various aspects of the present invention, the invention will now be more particularly described with reference to the following specific Examples.

EXAMPLE 1

A microreticulated microcrystalline cellulose product is prepared in aqueous dispersion by pumping 7910 pounds of deionized water with a conductivity of 6.0 micromhos into a mixing tank. 660 pounds of commercially available microcrystalline cellulose (Avicel PR101 product of FMC Corporation) is added to the water through a Tri-blender mixer. The mixture pH is about 6.05 and the conductivity is about 47 micromhos. This mixture separates quickly and must be agitated continuously to keep it suspended. The mixture is transferred to a hold tank and agitated at room temperature for approximately 2 hours. The suspension is then pumped through a high shear Rannie homogenizer system as described in FIG. 1, for 7 volumetric passes, with product samples being taken every pass. The product is cooled through a heat exchanger after each pass. One pass consists of the time calculated at the given flow rate, for all of the material in the hold tank to have passed through the homogenizer. The flow rate is 117.4 lbs/minute as pumped by a positive displacement pump to the homogenizer then through a micro-motion flowmeter to the heat exchanger and back into the same hold tank. The homogenizer inlet pressure is 13,400-13,600 psi. The inlet temperature to the homogenizer is held between 40° and 80° F. The temperature rise through the homogenizer is 40°-50° F. and the cooling from the heat exchanger is 34°-45° F.

The product is sampled each pass as the stream re-entered the hold tank. Samples are tested for particle size, total solids and viscosity (Brookfield). The solids level is measured to be 7.4±0.1% total solids as measured with a microwave solids oven. The particle size after the first pass stays relatively constant in the range of 10-17 microns and the viscosity increases steadily at approximately 2500 cps per pass. Viscosity is measured at 75°-80° F. using a Brookfield viscometer with a B T-bar spindle at 10 rpm. The viscosity is measured from the sample taken at the tank inlet until the viscosity is within 2000 cps of the target 15,000 cps. Bulk samples are then drawn from the hold tank and the viscosity measured. When the bulk sample reaches 14,000±1000 cps, the run is finished. After 7 passes, the sample viscosity is 18,000 cps and the tank sample measured 14,400 cps. The pressure driving the homogenizer is reduced to zero and the product continues to circulate until the tank temperature was less than 50° F. The product is then pumped into drums for storage.

The finished product has a smooth creamy texture with a white appearance and a bland taste. The final solids analysis is 7.7±0.1% and the viscosity is 13,340±1200 cps. The finished product particle size is 12.96±0.68 microns with conductivity of 63 micromhos and pH of 5.92. The water binding capacity is 10.3±3.0% as measured by the amount of water that is released during a centrifuge test. The calculated Herschel-Bulkley rheology parameters were: the consistency coefficient, m, 40–45, the power law index, n, 0.41–0.55 and the yield stress, 450–550 dyne/cm$^2$ as measured by a Carri-Med controlled stress rheometer with a 1°5- cm cone. at 25° F.

EXAMPLE 2

A suspension of Avicel PR101 microcrystalline cellulose product of FMC Corporation in deionized water was prepared and subsequently homogenized at high pressure to form a highly viscous fluid.

In this regard, 585 pounds of PH101-grade Avicel was suspended in 7,375 pounds of deionized water in a continuously stirred tank, resulting in a 7.36% solids solution. The batch mixing time was 15 minutes.

The suspension was passed serially through 3 Rannie homogenizers (FIG. 2) at a flow rate of 120 pounds per minute, then cooled through a plate heat exchanger and run through 3 more Rannie homogenizers and a final plate heat exchanger. All 6 homogenizers were operating at 13,500 psi inlet pressure. The initial fluid temperature was 60° F., increasing 40° per pass through the first 3 superpressure homogenizers. The solution was then cooled back down to 60° F. before entering the fourth homogenizer, where a 40° temperature rise per pass was also developed. After the sixth pass, the fluid was cooled to 76° F. and barrelled off. The final viscosity (Brookfield) after 6 passes was 30,800 cps, resulting in a thick, white paste.

EXAMPLE 3

Triglycerides (fats and oils) have long been known to impart pleasing textural and flavor properties to various dressing products and are conventionally used in substantial amounts in pourable dressings.

A number of substantially fat-free salad dressings are prepared using a low DE corn syrup and a microreticulated microcrystalline cellulose dispersion prepared as described in Example 1 or 2 to produce a marked improvement in textural/flavor properties. More specifically, the flavor profile is more rounded and many harsh notes are reduced through the incorporation of low DE corn syrup solids. The mouth coating and lingering aftertaste are also markedly improved. It should be noted that the use of dry high DE corn syrup solids does not produce the desired effect.

A substantially fat-free buttermilk-type dressing was prepared utilizing a microreticulated cellulose dispersion like that of Example 1 or 2, comprising approximately 7 weight percent of cellulose. The pourable dressing has the following composition:

| Buttermilk-Type Pourable Dressing | |
|---|---|
| Percentage (As Is) | Ingredients |
| 47.82322 | Water |
| 20.00000 | Buttermilk, Cultured Low Fat |

-continued

Buttermilk-Type Pourable Dressing

| Percentage (As Is) | Ingredients |
|---|---|
| 15.00000 | 25 DE Corn Syrup |
| 2.70000 | Microreticulated microcrystalline cellulose solids |
| 2.50000 | Blended Margarine Oil |
| 2.50000 | 120 Grain Vinegar |
| 2.00000 | Sugar (Sucrose) |
| 1.40000 | Salt |
| 0.5000 | Xanthan Gum |
| 0.792 | Stabilizers & Acidifiers (Phosphoric Acid) |
| 4.78478 | Flavors, Spices and Colorants |
| 100.0000 | |

In preparing the pourable dressing product, the microreticulated microcrystalline cellulose dispersion is placed in a high shear Breddo pump vortex mixer. The xanthan gum and sugar are blended together, and the xanthan/sugar mixture is slowly added to the microreticulated microcrystalline cellulose under vortex mixing conditions in the mixer, and mixed for several minutes to homogeneity. The low DE corn syrup together with the other dry and liquid ingredients are subsequently added to the blend under vortex shear conditions. A partially hydrogenated soybean oil having a melting point of about 100°-105° F. and an iodine value of about 92.5-95 is melted and added last, to evenly disperse the oil without emulsifying the oil. The dressing has excellent, creamy organoleptic characteristics.

A substantially fat-free thousand island dressing was prepared in the same manner having the following composition:

Fat Free Thousand Island Dressing

| Percentage (As Is) | Ingredients |
|---|---|
| 43.9519 | Water |
| 15.0000 | 25 De Corn Syrup |
| 14.0000 | Sugar |
| 6.5000 | 120 Grain Vinegar |
| 5.5000 | Tomato Paste |
| 5.0000 | Relish |
| 2.5000 | Microreticulated Microcrystalline cellulose solids |
| 2.3000 | Partially hydrogenated soybean oil |
| 1.7500 | Salt |
| 0.4000 | Xanthan Gum |
| 0.4410 | Stabilizers and Acidifiers |
| 2.6571 | Flavors, Spices and Colorants |
| 100.0000 | |

The dressing has a well rounded, creamy, fat mimetic mouthfeel.

A substantially fat-free French-type dressing was also prepared having the following composition.

Fat Free French Dressing

| Percentage (As Is) | Ingredients |
|---|---|
| 2.952166 | Water |
| 20.0000 | 25 DE Corn Syrup |
| 10.5000 | Sugar |
| 6.0000 | 120 Grain Vinegar |
| 2.6000 | Partially hydrogenated soybean oil |
| 2.0000 | Microreticulated microcrystalline cellulose solids |
| 1.8500 | Salt |

-continued

Fat Free French Dressing

| Percentage (As Is) | Ingredients |
|---|---|
| 0.5500 | Xanthan Gum |
| 0.341 | Stabilizers and Acidifiers |
| 3.206834 | Flavors, Spices and Colorants |
| 100.00000 | |

The French-type dressing has a pleasing, creamy, organoleptic character of a dressing having substantially higher fat content.

EXAMPLE 4

Two different batches of very low fat viscous dressings of the mayonnaise or salad dressing type are prepared using microreticulated microcrystalline cellulose. In preparing the substantially fat-free viscous dressings, a starch base and a very low fat emulsion are prepared and combined. The starch base is prepared from the following components:

| Ingredients | Batch 1 Wt. % | Batch 2 Wt. % |
|---|---|---|
| Water | 60.3 | 57.17 |
| 24 De Corn Syrup | 20.0 | 0.00 |
| Starch | 8.2 | 8.20 |
| Lactic Acid (50%) and 120 GR Vinegar | 11.0 | 13.78 |
| Sugar and Spice blend | 0.0 | 20.85 |

In preparing the starch base, water was added a jacketed vessel with sweep type agitator and under agitation the remaining ingredients were added in order. The resulting slurry was heated to 190° F. and held at this temperature for 1 minute. The starch base was cooled to room temperature and held for use.

An "emulsion" component was prepared from the following ingredients:

| Ingredients | Batch 1 Wt. % | Batch 2 Wt. % |
|---|---|---|
| Water | 55.690 | 62.325 |
| Vegetable Oil | 6.000 | 6.000 |
| Salt and Sucrose | 12.330 | 16.760 |
| Xanthan gum | 1.100 | 1.100 |
| Gums, Proteins & Stabilizers | 1.359 | 1.359 |
| Vinegar 120 gr | 1.700 | 4.000 |
| Nat & Art Color | .608 | .608 |
| 24 DE Corn Syrup Solids | 8.000 | .000 |
| Flavors, Spices, Vitamins and Preservatives | 8.438 | 2.518 |
| Microreticulated microcrystalline cellulose solids | 5.330 | 5.330 |

Note: The percentage of microreticulated microcrystalline cellulose (fat replacer) in the formulation is adjusted to yield a finished product dry cellulose solids content of 2.4%

In preparing the viscous dressing product, two thirds of the formula water is added to a mixing vessel under agitation, and the microreticulated microcrystalline cellulose is added thereto. In a separate vessel, the formula oil, gums, proteins and color are mixed to form an oil/gum slurry. The oil/gum slurry is added to water in a mixer and the components are mixed until well dispersed. The flavors and spices are then added. The salt and preservatives are dissolved in the remaining one third formula water and added to the mixture, while continuing mixing until a homogeneous mix is obtained. The emulsion was passed through a colloid mill with a gap setting to ensure a 4° F. heat rise, and the emulsion was collected for use in making the finished product.

The finished salad dressing products are made by combining the appropriate emulsion and starch base in a ratio of 45 weight percent emulsion and 55 weight percent starch base, and mixing to a homogeneous blend. The product has a smooth, creamy, organoleptic texture.

| | |
|---|---|
| Emulsion | 45.00% |
| Starch Base | 55.00% |

EXAMPLE 5

A microreticulated microcrystalline cellulose aqueous dispersion prepared in a manner similar to that of Example 1, is coated with an astringency reducing lipid to improve organoleptic characteristics.

500 grams of microreticulated microcrystalline cellulose dispersion and 220 grams of deionized water were stirred at high shear in a Tekmar mixer until the temperature reached 100° F. An edible food grade monoglyceride emulsifier (Dimodan OK) was heated gently on a hot plate until it transformed to a clear liquid. The liquid was added slowly to the vortex of the Tekmar mixer. After addition, the mixture became very thick and appeared aerated. The mixture was stirred for an additional 10 minutes and the temperature reached 160° F. The mixture was then poured into a glass jar at placed in the refrigerator. The beakers were difficult to clear, in contrast to containers with only the aqueous microreticulated microcrystalline cellulose dispersion, indicating that coating with the edible emulsifier had probably occurred.

In a similar manner, 5 grams of sodium stearoyl lactylate is added slowly to 500 grams of approximately 5 weight percent solids content microreticulated microcrystalline cellulose aqueous dispersion. The mixture was sheared at high speed with a Tekmar mixer for an additional 15 minutes. The final temperature is 170° F.

A similar run is made to mix 5 grams lecithin (Centrolex F or P Lecithin) in 500 grams of 5 weight percent microreticulated microcrystalline cellulose dispersion.

The coated samples exhibit reduced mouth drying characteristics.

It will be appreciated that food products having smooth, creamy, fat-mimetic characteristics are provided in accordance with the present invention. Although the present invention has been described with respect to various specific embodiments, various modifications will be apparent from the present disclosure, which are intended to be within the scope of the following claims.

What is claimed is:

1. A method for preparing a low fat or substantially fat-free food product comprising the steps of heating and repeatedly shearing at least two times an aqueous dispersion consisting of from about 3 to about 10 weight percent of microcrystalline cellulose and from about 90 to about 97 weight percent water in a high shear zone having a pressure drop of at least 12,000 psi to fragment the microcrystalline cellulose to submicron sized microcrystalline cellulose fragments and reagglomerating the crystalline cellulose fragments under high shear conditions to produce an aqueous dispersion of porous microreticulated microcrystalline particles having a void volume at least about 25 volume percent, a mean particle size in the range of from about 5 to about 20 microns, and a particle size distribution such that at least about 75 weight percent of the particles have a maximum dimension of less than about 25 microns, combining said microreticulated microcrystalline cellulose dispersion with from about 2 to about 33 weight percent of xanthan gum, based on the dry weight of said microreticulated microcrystalline cellulose dispersion, and blending said xanthan stabilized microreticulated microcrystalline cellulose dispersion with additional food components to provide a low fat or fat-free food product comprising from about 0.25 to about 4 weight percent of dispersed microreticulated microcrystalline cellulose, from about 50 to about 99 weight percent of water, from about 1 to about 35 weight percent of carbohydrates, from about 0 to about 10 weight percent protein, and less than about 7 weight percent triglycerides.

2. A method in accordance with claim 1 wherein said food product comprises from about 1 to about 25 weight percent of low dextrose equivalent corn syrup solids.

3. A method in accordance with claim 2 wherein said product is a pourable or viscous dressing.

4. A method for preparing a low fat or substantially fat-free food product fat substitute material comprising the steps of heating and repeatedly shearing at least two times an aqueous dispersion comprising from about 3 to about 10 weight percent of microcrystalline cellulose and from about 90 to about 97 weight percent water in a high shear zone having a pressure drop of at least 12,000 psi to fragment the microcrystalline cellulose fragments and reagglomerating the crystalline cellulose fragmnets under high shear conditions to produce an aqueous dispersion of, porous microreticulated microcrystalline particles having a void volume at least about 25 volume percent, a particle size in the range of from about 5 to about 20 microns, and having a mean particle size distribution such that at least about 75 weight percent of the particles have a maximum dimension of less than about 25 microns, and combining said microreticulated microcrystalline cellulose dispersion with from about 1 to about 20 weight percent of a xanthan gum, based on the dry weight of said microreticulated microcrystalline cellulose.

5. A low fat or substantially fat-free pourable dressing product comprising in homogeneously blended form, from about 2 to about 3 weight percent of porous microreticulated microcrystalline cellulose having a void volume of at least about 25 volume percent, from about 0.25 to about 1 weight percent of xanthan gum, from about 5 to about 25 weight percent of low dextrose equivalent corn syrup solids, and less than about 3 weight percent of triglycerides, and from about 35 to about 90 percent water.

* * * * *

UNITED STATES PATENT AND TRADEMARK OFFICE
CERTIFICATE OF CORRECTION

PATENT NO. : 5,011,701

DATED : April 30, 1991

INVENTOR(S) : Baer et al.

It is certified that error appears in the above-identified patent and that said Letters Patent is hereby corrected as shown below:

On Title page

Item [63] Related U.S. Application Data, line 10, after "Aug. 3, 1987, abandoned" insert --which is a continuation-in-part of Ser. No. 307,069, filed Feb. 6, 1989, now abandoned--.

Item [56] References Cited, change "Kmatochoil" to --Kratochvil--.

```
Column 4, line 35, change "weaken" to --weakens--.
Column 6, line 10, change "CD-30" to --CD30--.
Column 7, line 1, change PR101" to --PH101--.
Column 7, line 33, change PR101" to --PH101--.
Column 8, line 56, change PR101" to --PH101--.
Column 10, line 28 , change "5-1" to --.5-1--.
Column 17, line 50, change "34-45°" to --35-45°--.
Column 18, line 18, change "PR101" to --PH101--.
Column 10, line 62, change "2.952166" to --52.952166--.
```

Signed and Sealed this

Twenty-ninth Day of December, 1992

Attest:

DOUGLAS B. COMER

*Attesting Officer*     Acting Commissioner of Patents and Trademarks